United States Patent [19]

Whited et al.

[11] Patent Number: 5,666,253

[45] Date of Patent: Sep. 9, 1997

[54] PROTECTIVE SHIELD FOR ELECTRICAL HOT STICK

[75] Inventors: Gary L. Whited, Kirkersville; James R. Stillwagon, Worthington; Randall A. Maxey, Westerville, all of Ohio

[73] Assignee: Gary Guard, Inc., Hilliard, Ohio

[21] Appl. No.: 500,347

[22] Filed: Jul. 10, 1995

[51] Int. Cl.⁶ .................................................. H02H 3/00
[52] U.S. Cl. ........................... 361/1; 361/816; 361/835; 174/5 R
[58] Field of Search ............................ 361/91, 115, 1, 361/816, 835; 29/747; 294/19.1; 307/326; 174/5 R

[56] References Cited

U.S. PATENT DOCUMENTS 3,538,532  11/1970  Shortino et al. .................. 15/248
3,866,965   2/1975  Homeier .......................... 294/19 R
5,077,448  12/1991  Andrew ............................ 174/5 R

*Primary Examiner*—Jeffrey A. Gaffin
*Assistant Examiner*—Stephen Jackson
*Attorney, Agent, or Firm*—Sand & Sebolt

[57] ABSTRACT

A protective shield adapted to be clamped to an electrical hot stick of the type used for performing electrical work on various types of energized electrical equipment. The protective shield includes a transparent plate formed of an impact resistant plastic material and a clamping mechanism for securing the plate to a hot stick. An opening in the plate allows for passage of the hot stick through the plate, afterwhich a pivotally mounted clamp arm and bolt arm are secured together about the hot stick. The protective shield provides physical protection to linemen working in live-line or deenergized maintenance situations by acting as a barrier between the lineman and the equipment while providing complete visibility to the task being performed.

24 Claims, 6 Drawing Sheets

PROTECTIVE SHIELD FOR ELECTRICAL HOT STICK

BACKGROUND OF THE INVENTION

1. Technical Field

The invention relates to a protective device and in particular, to a protective shield for use in the electrical industry. More particularly, the invention relates to a protective shield which can be clamped to existing dielectric poles known as hot sticks, switch sticks, or disconnect sticks, which provides physical protection from electrical arcs, electrical flashes and fragmentation explosions which can occur while pulling pad mounted switches, inserting fuses into overhead transformers and performing numerous other applications using the dielectric sticks.

2. Background Information

Line maintenance on electrical transformers, fuses and switches pose a threat of injury to linemen who maintain them. Often this equipment is energized while being worked on. This charged equipment can occasionally cause electrical arcs, electric flashes and fragmentation explosions when the switch is being opened. These arcs, flashes or explosions are capable of causing electrical burns, molted metal burns, and flesh wounds by flying debris. While inserting fuses into overhead transformers, fuses may fall out of the hot stick holder during insertion and fall back on the installer while the user is in an uncompromising position.

Current protective devices include eye protection, hard hats, and flame retardant clothing and gloves. Although these devices protect the user from serious injury they do not protect the user from physical contact with the flashes, or falling debris and fuses. The user is still exposed to possible injury in areas of the face and neck. The user is still susceptible to cuts and bruises which can occur even through their protective clothing.

The present invention shields the user from flashes and debris by reflecting the potentially harmful materials away from the user. Also, it is necessary that a worker has good visioned contact of the equipment on which the switch function is being performed. Likewise, such protective device must be adaptable for use with existing equipment and must be able to be stored and protected during transit in trucks without occupying a large amount of space due to the limited space available on utility line trucks. The transparent material from which the shield is composed allows the user to see the work area through a protective shield, yet enables the shield to function as a barrier between the user and any flashes, debris, or falling fuses.

Therefore, the need exists for a protective shield, preferably formed of a transparent polycarbonate, which allows the user to view the work area through the protective shield, which provides protection during the use of dielectric sticks, which can be easily stored in a carrying case, and which can be easily and quickly clamped to dielectric sticks of various diameters. There is no such protective shield of which we are aware which accomplishes these results.

SUMMARY OF THE INVENTION

Objectives of the invention include providing a protective shield that physically protects linemen from electrical arcs, electrical flashes and fragmentation explosions and falling objects and debris which occur during the pulling of pad mounted switches, the insertion of fuses into overhead transformers, or numerous other applications using dielectric hot sticks.

Another objective of the invention is to provide such a protective shield which has a clamping mechanism that allows the protective shield to be clamped to dielectric sticks of various sized diameters.

A still further objective of the invention is to provide such a protective shield which is made from a transparent, flame resistant material such as a polycarbonate, which allows the user to view the work area through the protective shield, yet protects the user from fragmentation explosions which cause electrical burns, molted metal burns, flesh wounds by flying or falling debris or fuses that fall out of the dielectric stick holder during insertion and fall back on the user while the user is in an uncompromising position.

Another objective of the invention is to provide such a protective shield which can be easily stored on a truck in a protective carrying case and can be easily and quickly secured to the dielectric stick, preferably with a wing nut mechanism, and which is comprised of one unit with no secondary parts which are subject to breakage and loss.

Still another objective of the invention is to provide such a protective shield which has a secondary shield which covers a cutout areas of the protective shield, which areas allow for the passage of the hook end and control rods of various types of dielectric sticks through the shield during mounting of the protective shield on the dielectric stick.

A further objective of the invention is to provide such a protective shield which can be different sizes and shapes, allowing the protective shield to used for various applications.

These objectives and advantages are obtained by the hot stick shield of the present invention the general nature of which may be stated as including a plate formed of a transparent material; and clamping means for removably mounting the plate to the hot stick.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numbers refer to similar parts throughout the drawings.

DESCRIPTION OF THE PREFERRED EMBODIMENT

Figure 1:
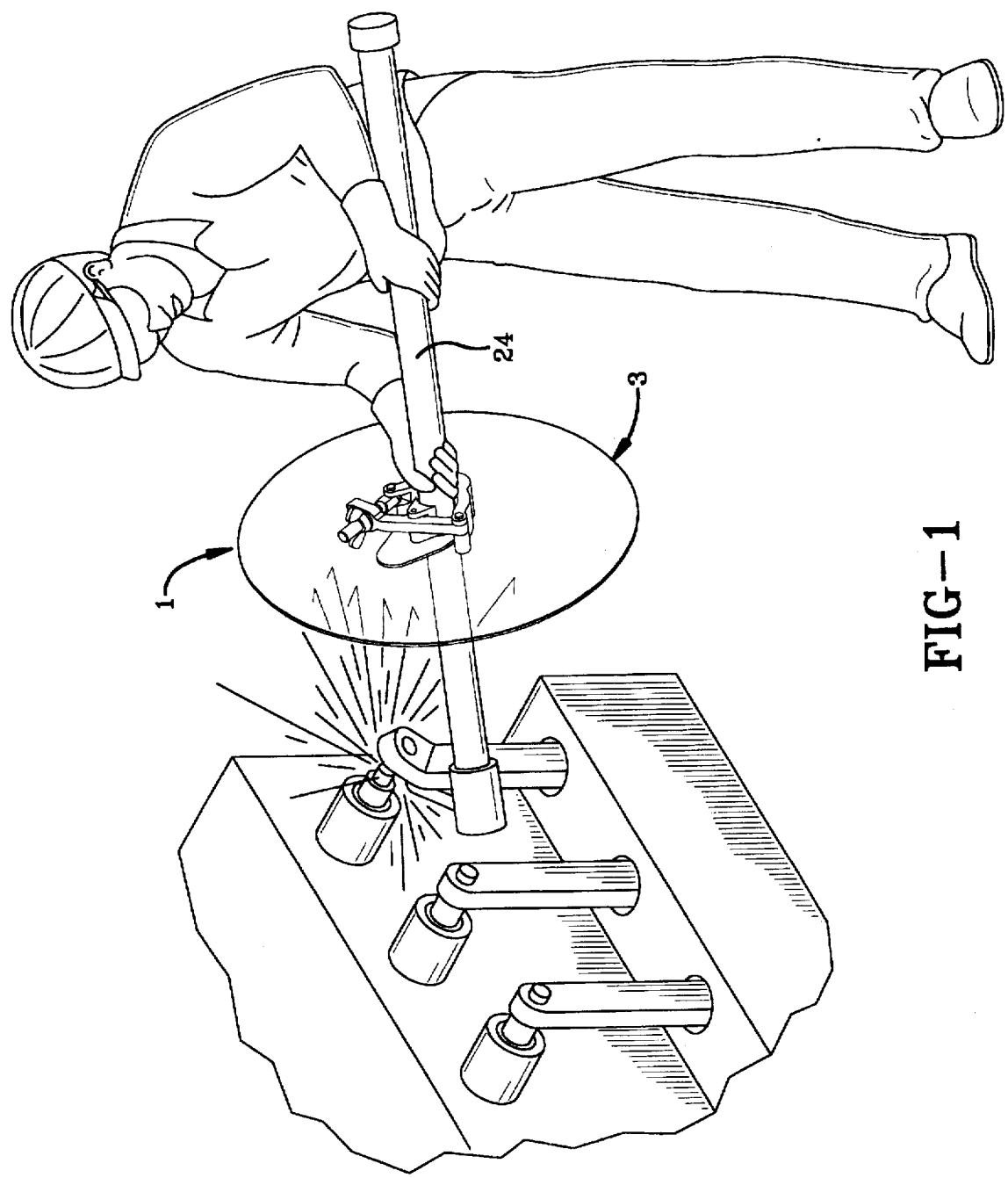
FIG. 1 is a diagrammatic perspective view of one embodiment of the protective shield of the present invention during use.

The protective shield of the present invention is indicated generally at 1, and is shown during use in FIG. 1. The circular shape of the protective shield as shown in FIG. 1 is just one of several possible shapes of the present invention. The protective shield includes a plate indicated generally at 3, preferably formed from a transparent flame retardant plastic material such as polycarbonate. Plate 3 (FIG. 2) is formed with a central opening 4 such that a dielectric stick, commonly referred to as a "hot stick", of various diameters can pass through the opening. One such hot stick is indicated generally at 2 and includes a hot stick hook 7 attached to a cylindrical pole 24. Opening 4 includes a pair of diametrically opposed slots 5 and 6 for permitting passage of a protruding portion of the hot stick therethrough, such as hook 7. Slot 5 is larger than slot 6 and allows for passage of hot stick hook 7, whereas slot 6 allows for the passage of the slide rod (not shown) of a shotgun type hot stick.

Although the device of the present invention is indicated as being used on a hot stick, it is readily understood to anyone skilled in the art that the device can be used on other types of rods or similar devices for actuating other types of equipment where protection is desired, such as the turning of a valve or other equipment, where injury could occur to the individual, other than with electrical equipment.

Figure 2:
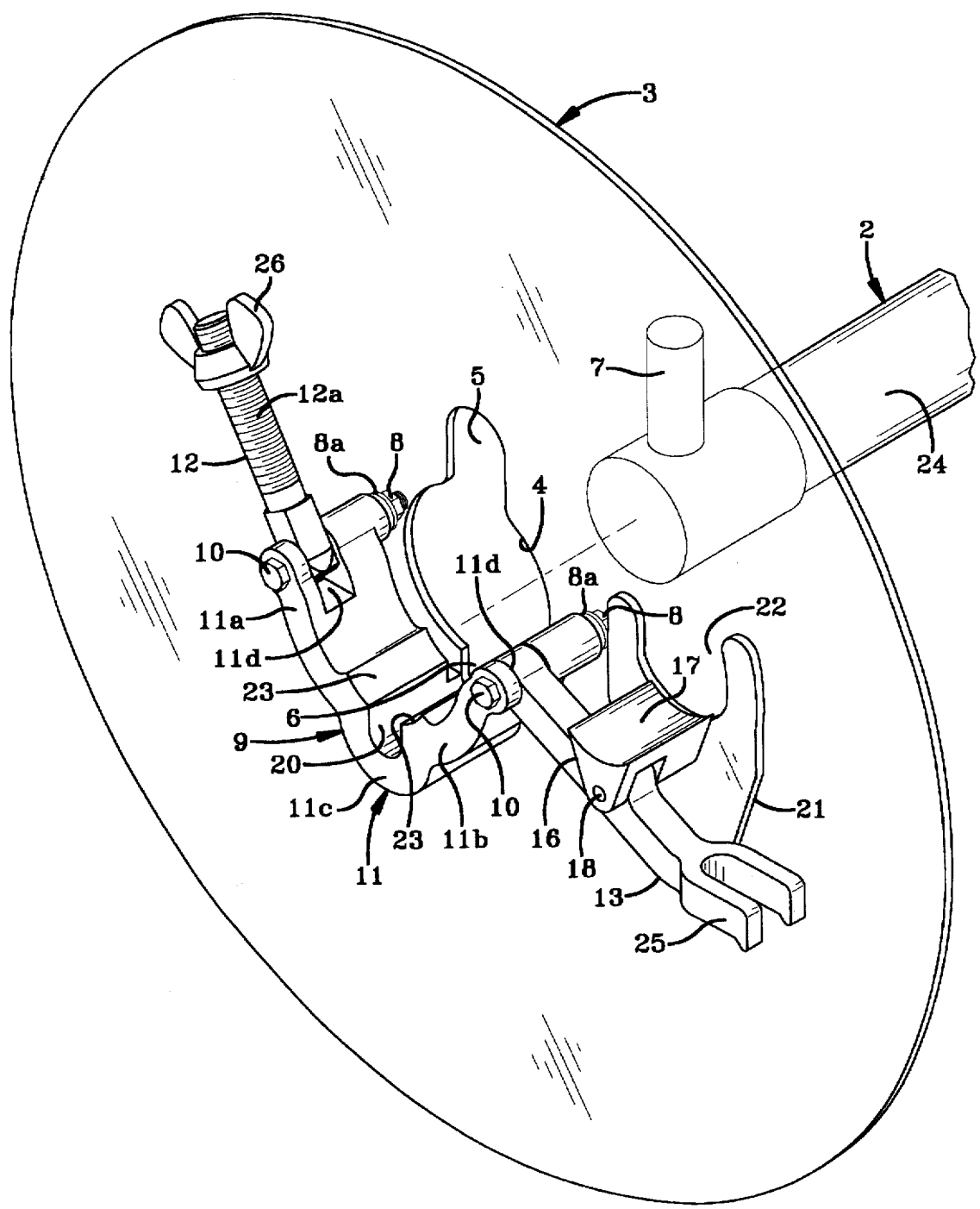
FIG. 2 is an enlarged perspective view of the protective shield with the clamping mechanism in an open and unclamped position and a fragmentary view of a dielectric stick.
Figure 3:
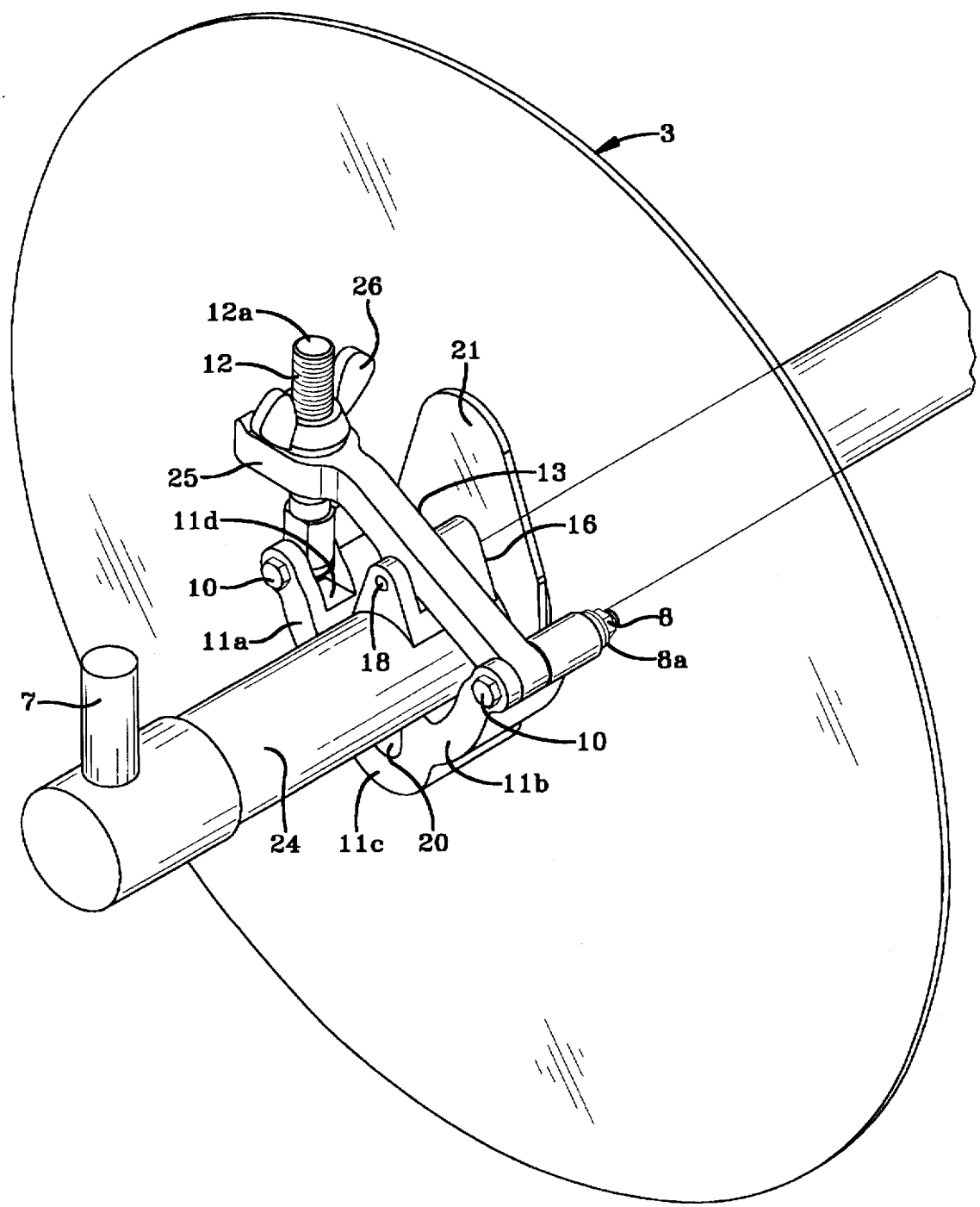
FIG. 3 is a perspective view of the protective shield of FIG. 2 with the clamping mechanism in a closed and clamped position, locking the protective shield to a dielectric hot stick.

A clamping mechanism indicated generally at 9, is attached to plate 3, and includes a base 11, a bolt arm 12 and a clamp arm 13. The clamping mechanism is secured to plate 3 by at least two fastening bolts 10 and associated nuts 8 and washers 8a (FIG. 2), and is adapted to be clamped around inserted hot stick 2 in a plane perpendicular to the stick, as shown in FIG. 3.

Base 11 includes an internally threaded hole 14 (FIGS. 4 and 5) in which a third fastening bolt 15 is inserted from the opposite side of plate 3 than that of bolts 10, through plate 3 and into hole 14. Base 11 has a V-shaped configuration (FIGS. 2 and 4) formed by a pair of outwardly extending angled legs 11a and 11b which join together at a curved corner 11c. A U-shaped recess 20 is formed in curved corner 11c, and extends throughout the width of base 11 and is complementary to and aligns with slot 6, the purpose of which is discussed below. Arcuate clamping surfaces 23 are formed on each of the base legs adjacent recess 20 for engagement with cylindrical pole 24 of hot stick 2. The outer ends of legs 11a and 11b are each formed with a central recess 11d.

Bolt arm 12 and clamp arm 13 each have first and second ends. The first ends of the arms are pivotally mounted within recesses 11d and are attached to base legs 11a and 11b by fastening bolts 10, such that the arms can be pivoted in the plane parallel to that of plate 3 between an open position and a closed clamped position as shown in FIGS. 2 and 3, respectively.

A rocker shoe 16 is pivotally attached to clamp arm 13 by a bolt 18 such that rocker shoe 16 is pivoted in the same plane as clamp arm 13 with respect to plate 3. Rocker shoe 16 has a generally triangular shape with a concave shaped outer surface 17. Rocker shoe 16 is attached to clamp arm 13 whereby concave shaped surface 17 clamps against pole 24 of hot stick 2 when clamping mechanism 9 is in the closed clamped position, as shown in FIG. 3, and in combination with clamping surfaces 23 of base 11, securely clamp pole 24 to plate 3.

Figure 4:
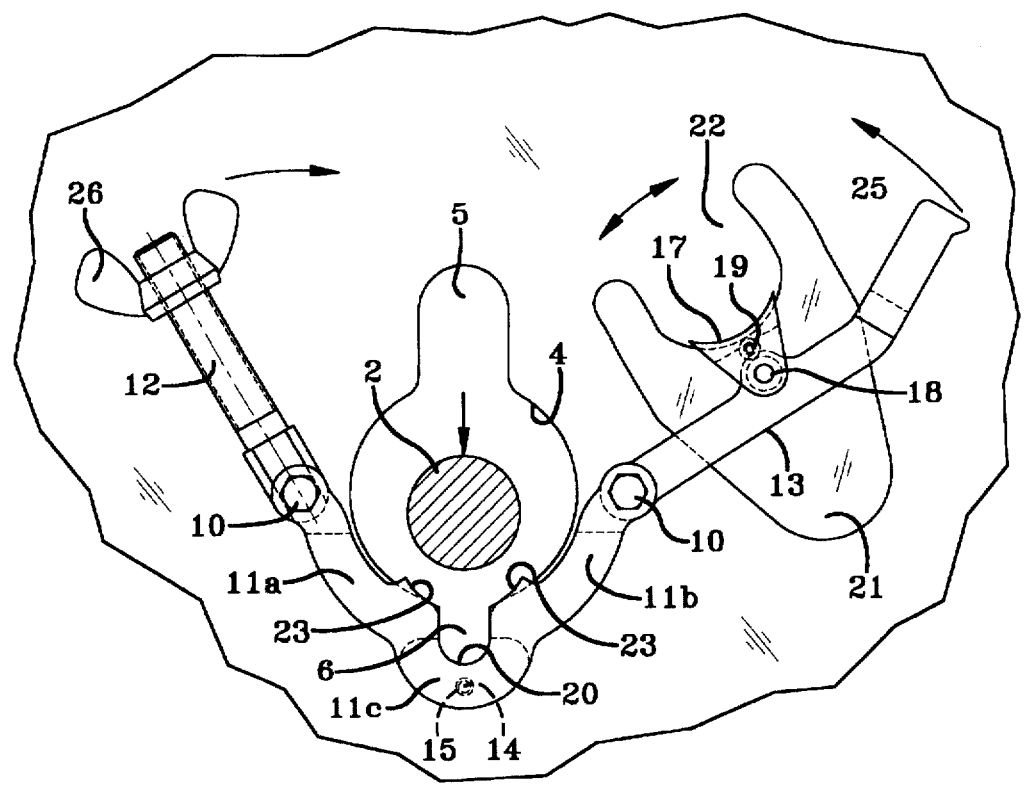
FIG. 4 is a frontal fragmentary view of the protective shield showing the clamping mechanism in the open and unclamped position and with a hot stick being shown in section.

A secondary shield 21 is attached to rocker shoe 16 between the rocker shoe and plate 3. Secondary shield 21 is fastened to rocker shoe 16 by bolt 18 and by a fastener pin 19 as shown in FIG. 4. Secondary shield 21 is formed with a U-shaped opening 22 for enclosing a portion of hot stick 2 when inserted through plate opening 4. The secondary shield has a configuration sized to cover exposed portions of plate opening 4, such as slot 5, and the annular area between pole 24 and the periphery of opening 4, when shield 21 partially encloses hot stick 2.

Figure 5:
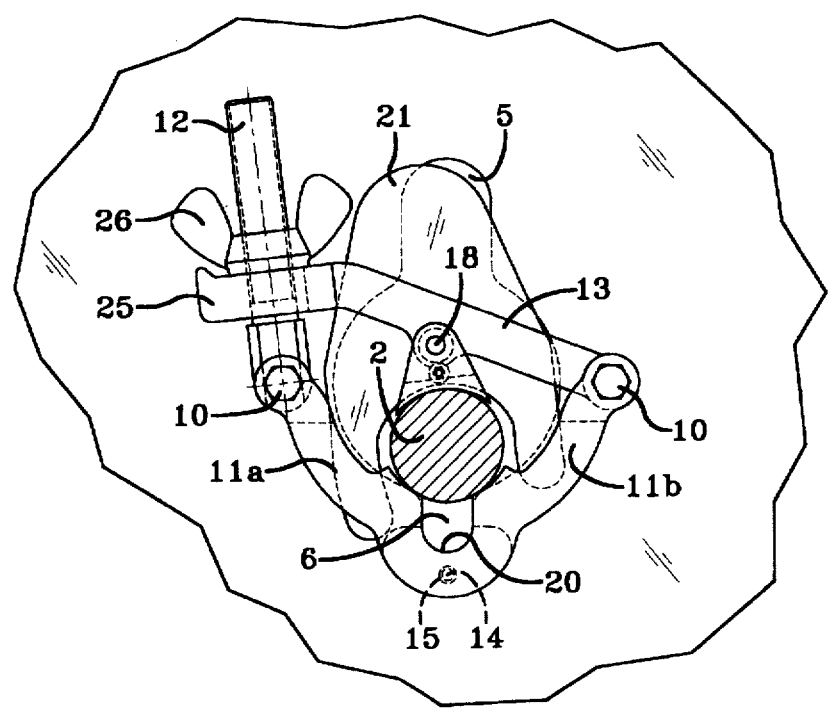
FIG. 5 is a frontal fragmentary view of the protective shield of FIG. 4 showing the clamping mechanism is a closed and clamped position.

A yoke 25 is formed at the second end of clamp arm 13, for receiving bolt arm 12 therein when clamping mechanism 9 is in a closed clamped position, as shown in FIGS. 3 and 5. A fastening nut 26, such as a wing nut, is adjustably mounted on threaded portion 12a of bolt arm 12 and clamps arm 13 in its locked position as shown in FIG. 3. Bolt arm 12 is engaged by yoke 25 as fastening nut 26 is tightened against the yoke until the concave surface 17 of rocker shoe 16 is pressed firmly against hot stick 2 as described above. Secondary shield 21 is automatically positioned around hot stick 2 when clamp arm 13 is pivoted into its closed and clamped position.

Figure 6:
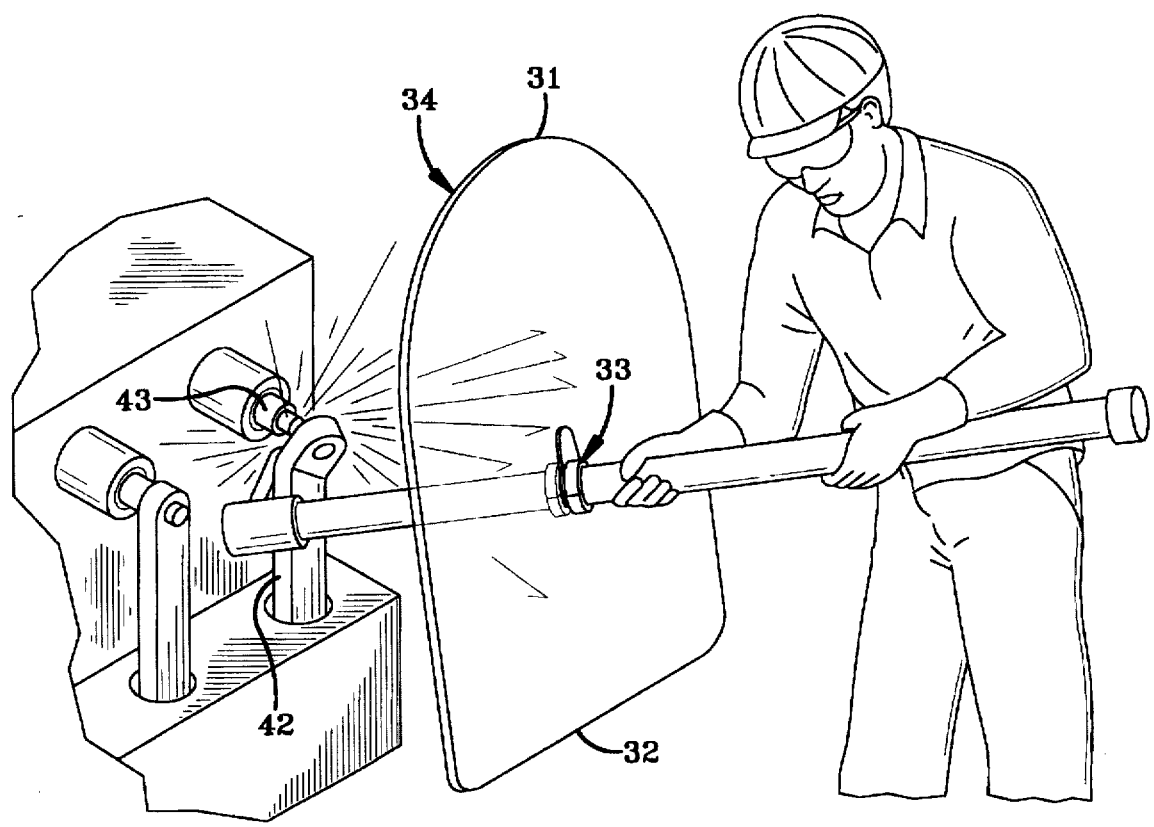
FIG. 6 is a diagrammatic perspective view of a second embodiment of the protective shield during use.

A second embodiment of the present invention is shown in FIG. 6 and is indicated generally at 34, and is shown in use disconnecting a terminal 42 from its attachment post 43. The arced or curved top 31 and a rectangular bottom 32 of plate 4 shown in FIG. 6, is another of the many different sizes and shapes of the protective shield. The protective shield can be manufactured in different sizes and shapes depending on the application of use and the user's needs. FIG. 6 also shows a second of many different clamping mechanisms that can be used to secure the plate to the hot stick.

Figure 9:
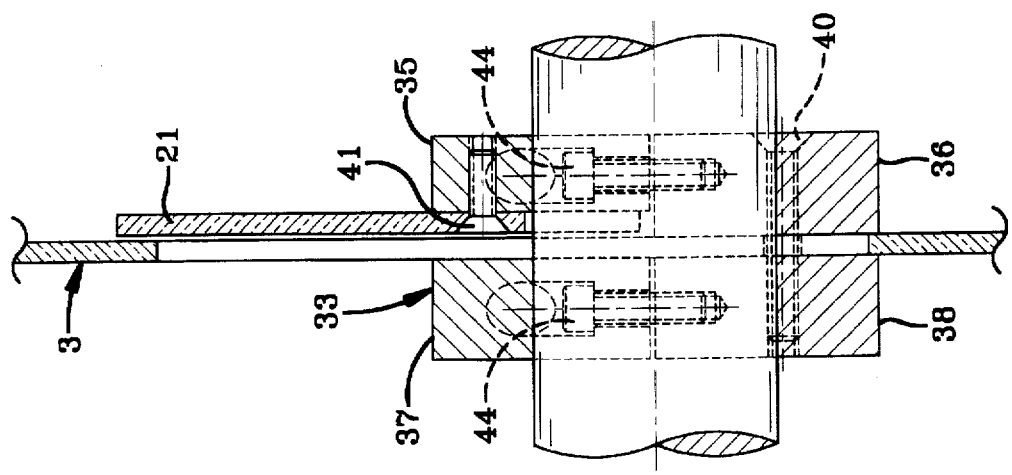
FIG. 9 is a fragmentary sectional view taken on line 9—9, FIG. 8.
Figure 8:
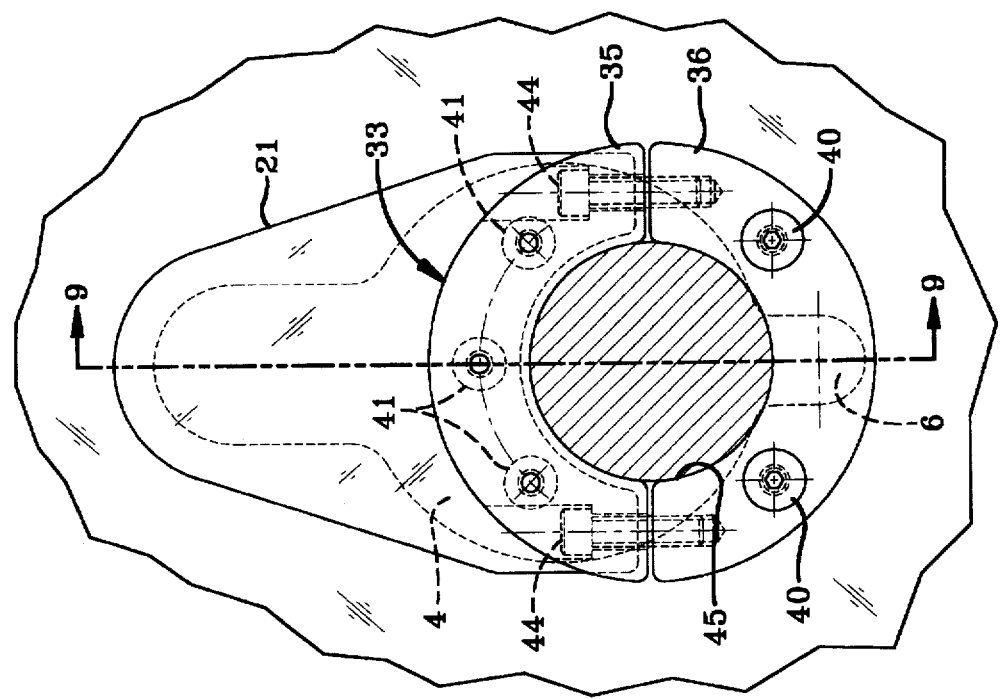
FIG. 8 is a frontal fragmentary view of the clamping mechanism of FIG. 7 in a closed and clamped position on a hot stick shown in section.

FIGS. 8 and 9 show the clamping mechanism of the second embodiment, which is indicated generally at 33. Clamping mechanism 33 includes four semi-circular clamping members 35, 36, 37 and 38. Two screws 40 secure clamping member 36 to clamping member 38 such that plate 3 is sandwiched and clamped between the two clamping members. Clamping members 36 and 38 are positioned adjacent to plate opening 4 and hook receiving slot 6. Two bolts 44 as shown in dot-dash lines fasten clamping members 35 and 37 to clamping members 36 and 38 respectively. When bolts 44 fasten clamping member 35 to clamping member 36 and clamping member 37 to clamping member 38, each pair forms a circular clamp providing a central circular opening 45 through which hot stick 2 passes and is secured. Secondary shield 21 is secured to clamping member 35 with three screws 41 whereby secondary shield 21 is between clamping member 35 and plate 3.

Figure 7:
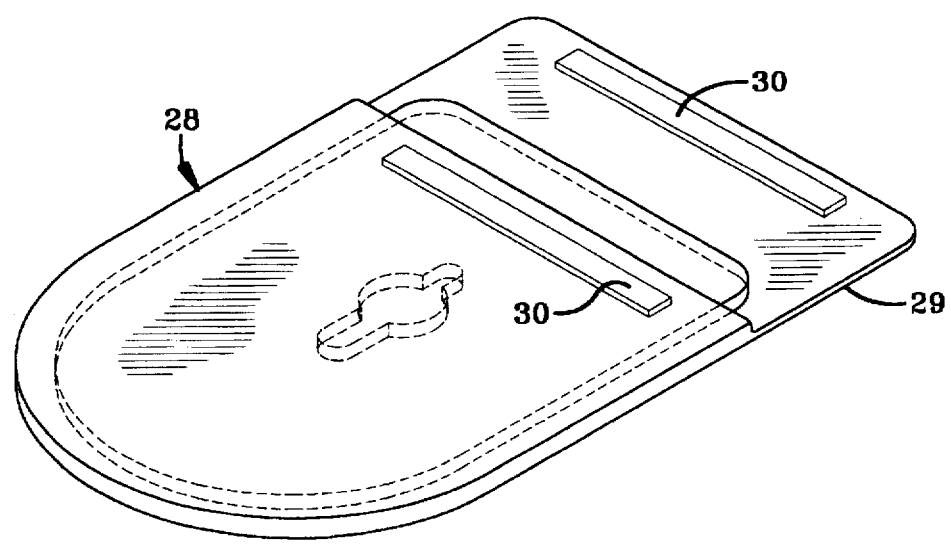
FIG. 7 is a diagrammatic perspective view showing the protective shield of the second embodiment partially inserted in a carrying case, without the clamping mechanism attached.

In accordance with another of the features of the invention, the protective shield can be removed easily from the hot stick when not in use and stored in a protective carrying case. FIG. 7 shows the protective shield of the second embodiment without the clamping mechanism being visible, partially inserted into a carrying case, indicated generally at 28. Carrying case 28 has a flap 29 and a fastening device 30 such as a strip of VELCRO material. Carrying case 28 protects the protective shield from damage while being transported and serves as a storage container which prevents the protective shield from being caught on hot sticks or other equipment which may be stored alongside the protective shield in a utility line truck or other storage facility.

Although device 1 is shown in the drawings as being used in connection with ground-mounted equipment, it is readily understood that the device will also be highly effective when working on overhead lines on a pole, tower or other overhead-located equipment.

In summary, the protective shield of the present invention provides a relatively simple and inexpensive, yet highly efficient and effective device, which is readily mounted on and removed from various diameter hot sticks to protect a worker from falling objects and electrical arcs, flashes and fragmentary explosions, and in which the shield can be easily removed and placed in a convenient protective storage case and provides the user with protection without restricting his mobility while utilizing the device the invention.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved security container is constructed and used, the characteristics of the construction, and the advantageous, new and useful results obtained; the new and useful structures devices, elements, arrangements, parts and combinations, are set forth in the appended claims.

We claim:

1. A protective shield for mounting on an electrical hot stick including:

a plate formed of a transparent dielectric flame retardant material;

an opening formed in the plate for receiving the hot stick therethrough; and clamping means for removably mounting the plate to the hot stick.

2. The protective shield defined in claim 1 in which the opening includes a pair of diametrically opposed slots for permitting passage of a protruding portion of the hot stick therethrough.

3. The protective shield defined in claim 1 in which the clamping means includes four semi-circular clamping members.

4. The protective shield defined in claim 1 including a case having a storage compartment for receiving the protective shield therein.

5. The protective shield defined in claim 1 in which the clamping means includes at least two fasteners for securing said clamping mechanism on the plate.

6. The protective shield defined in claim 5 in which the clamping means includes a base, a bolt arm and a clamp arm, said bolt arm and clamp arm being pivotally attached to the base and movable between an open position and a closed clamped position.

7. The protective shield defined in claim 6 in which the clamp arm includes a pivotally attached rocker shoe.

8. The protective shield defined in claim 7 including a secondary shield attached to the rocker shoe adjacent to the plate.

9. The protective shield defined in claim 8 in which the secondary shield is formed of a flame retardant material.

10. The protective shield defined in claim 8 in which an end of the clamp arm is U-shaped; and in which said U-shaped end receives the bolt arm therein when the clamping means is in the closed clamped position.

11. The protective shield defined in claim 10 in which a nut is fastened to the bolt arm for securing the clamping means in a closed clamped position.

12. The protective shield defined in claim 11 in which the rocker shoe extends about a portion of the hot stick when the clamping mechanism is in a closed clamped position.

13. A protective shield for mounting on an electrical hot stick including:

a plate formed of a transparent material; and a clamping mechanism for removably mounting the plate to the hot stick, said clamping mechanism including four semi-circular clamping members.

14. The protective shield defined in claim 3 including fasteners for securing two of said four clamping members together with the plate being sandwiched inbetween.

15. The protective shield defined in claim 14 in which two other of the four clamping members are secured to the said two clamping members whereby the said four semi-circular clamping members provide two circular clamps formed with aligned central circular openings aligned with an opening formed in the plate.

16. The protective shield defined in claim 15 in which a secondary shield is fastened to one of the four clamping members and located between the said one clamping member and the plate.

17. A protective shield for mounting on an electrical hot stick including:

a plate of transparent material formed with an opening for receiving the hot stick therethrough, said opening including a pair of diametrically opposed slots for permitting passage of a protruding portion of the hot stick therethrough; and clamping means for removably mounting the plate to the hot stick.

18. The protective shield defined in claim 17 in which said slots include a large slot and a small slot, said large slot allowing for passage of a hot stick hook therethrough and said smaller slot allowing for the passage of a hot stick slide rod therethrough.

19. The protective shield defined in claim 17 in which a secondary shield is formed with a U-shaped opening for enclosing a portion of the hot stick when inserted through the plate opening.

20. The protective shield defined in claim 15 in which the secondary shield has a configuration size to cover exposed portions of the plate opening when the secondary shield partially encloses the hot stick.

21. A protective shield for mounting on an electrical hot stick including:

a plate formed of a transparent material;

clamping means for removably mounting the plate to the hot stick; and a case having a storage compartment for receiving the protective shield therein.

22. The protective shield defined in claim 4 including closure means on the case for securing the protective shield in said case.

23. A protective shield for mounting on an electrical hot stick including:

a plate formed of a transparent material; and a clamping mechanism for removably mounting the plate to the hot stick, said clamping mechanism including at least two fasteners for securing said clamping mechanism on the plate.

24. In combination, an electrical hot stick and a protective shield mounted on said hot stick;

said shield including a plate formed of a transparent dielectric material with an opening formed therein, said hot stick being formed of a dielectric material and extending through said opening; and a clamping mechanism securing the plate to the hot stick, said hot stick having a first end adapt to be grasped by a user of the combination and a second end having a work performing mechanism thereon.

* * * * *